United States Patent [19]

Kimura

[11] 4,139,971
[45] Feb. 20, 1979

[54] MOLDING CLIP ASSEMBLAGE
[75] Inventor: Shigeru Kimura, Kamakura, Japan
[73] Assignee: Nifco Inc., Tokyo, Japan
[21] Appl. No.: 844,015
[22] Filed: Oct. 20, 1977
[30] Foreign Application Priority Data
 Oct. 28, 1976 [JP] Japan .................. 51-128789
[51] Int. Cl.² .............................. E06B 3/58
[52] U.S. Cl. ................................. 52/208
[58] Field of Search ............ 24/73 R, 73 FT, 73 PC, 24/73 PM, 73 HS; 296/DIG. 4, 71 R, 70, 62, 84 R, 84 A, 93; 52/716–718, 710, 208

[56]  References Cited
 U.S. PATENT DOCUMENTS

| | | | |
|---|---|---|---|
| 3,509,666 | 5/1970 | Trout | 52/716 |
| 3,543,465 | 12/1970 | Jackson | 52/716 |
| 3,911,637 | 10/1975 | Schmidiger | 52/717 |

Primary Examiner—John E. Murtagh
Attorney, Agent, or Firm—Jack R. Halvorsen; Robert W. Beart

[57] ABSTRACT

A molding clip assemblage is disclosed which comprises a base plate fastened such as with a double-faced adhesive tape to the peripheral edge of a window frame for enclosing a glass windshield and clips attached at proper intervals to the frontal side of said base plate. A given molding, when forced in between the base plate adhering to the peripheral edge and the clips secured to said base plate, can be safely mounted in position without inflicting any damage at all upon the peripheral edge. The molding thus secured serves to provide the windshield with a seal perfectly impervious to rainwater and dust from the surroundings.

10 Claims, 11 Drawing Figures

MOLDING CLIP ASSEMBLAGE

BACKGROUND OF THE INVENTION

This invention relates to a device for mounting a decorative molding in position about the periphery of the windshield or rear window of an automobile.

As is well known, when a glass plate is inserted in the front or rear window opening of an automobile to form a windshield or rear window, a molding is mounted along the opening left between the peripheral edge of the window and the edge of the glass plate so as to fill up the opening and, at the same time, give a decorative effect to the boundary. Various methods have heretofore been proposed for the placement of such moldings. In the case of an operation wherein there is used a molding made of a metallic sheet, the work of attachment of the molding should be carried out with the utmost precaution exercised to prevent the molding from scraping off the paint already applied to the peripheral edge of the window.

Among the methods suggested to date, there are, for example, included a method which comprises planting a plurality of studs at suitable intervals along the peripheral edge of a window, allowing a glass plate to be fastened to said peripheral edge with the medium of an adhesive agent, immobilizing the glass plate against the window frame by having plastic clips brought into hooking engagement with said studs and securing a molding by means of the clips and another method which comprises preparatorily setting clips made of a resilient metal sheet in position along the edge of a glass plate, immobilizing the glass plate against the window frame with the medium of an adhesive agent applied to the peripheral edge of the window and, at the same time, immobilizing the clips and thereafter bringing a molding into hooking engagement with the immobilized clips.

The former method has a disadvantage that the studs to which the clips are fastened must be welded in advance to the window frame and the fastening of the clips requires experience on the part of workers and the latter method similarly has a disadvantage that it cannot easily be adapted for incorporation into an assembly line because of the complicated work involved in the preparatory application of adhesive agent to the window frame and a highly skilled work required in the setting of glass plate in the window and, worse still, the use of clips made of a metallic material entails a possibility of inflicting damage to the coated surface of the window frame during the work of their insertion and consequently rendering the window frame susceptible to rusting.

The applicant formerly developed a molding clip as disclosed in U.S. Ser. No. 799,863 for overcoming the various shortcomings suffered by the conventional devices for the attachment of moldings.

The invention of said U.S. Application aims to provide a molding clip assemblage, which comprises clips having a double-faced adhesive tape attached to the rear surface thereof, molding catches and resilient holder pieces serving to receive resiliently the edge of a glass plate, whereby the glass plate and a molding are secured to the window frame by causing the exposed surface of the adhesive tape applied to the clips to be attached to the window frame, allowing the edge of the glass plate to rest on the resilient holder pieces and inserting the molding between the window frame and the rear surfaces of the clips so as to be held in position by the molding catches. The clips are further provided each on their rear surfaces with a protective tongue piece adapted to protect the window frame from damage otherwise possibly sustained during the insertion of the molding between the window frame and the clips.

This molding clip assemblage has eliminated the disadvantages suffered by the conventional methods of molding attachment and has made it possible to smoothly and efficiently attach glass plates and moldings to automobile bodies in automobile assembly line without doing any harm to the coated peripheral edges of window frames. Where the molding is mounted by the medium of such clips, however, since the protective tongue pieces serving to furnish necessary protection for the clips fastened at proper intervals to the peripheral edge of the window frame intervene between the edge of the molding and the peripheral edge of the window frame, there inevitably occur gaps having a thickness at least equalling that of said protective tongue pieces between the edge of the molding and the peripheral edge of the window frame. From the occurrence of these gaps, there ensue various problems such as loss of imperviousness of the molding to rainwater and dust from the ambience and unaesthetic exposure to sight of the leading ends of such underlying protective tongue pieces.

The present invention has originated in a study which was motivated by the persisting problems mentioned above and was launched in search of a device capable of providing efficient attachment of the molding while, similarly to the preceding improvement, doing absolutely no harm to the coated peripheral edge of the window frame.

An object of the present invention is to provide a molding clip assemblage which enables the molding to be secured to the window frame without inflicting any damage upon the coated peripheral edge of window frame and without entailing occurrence of gaps between the window frame and the molding.

Another object of the present invention is to provide a molding clip assembly which can be easily and inexpensively produced integrally by the injection molding of a plastic material and which provides excellent workability because of the great ease with which the clips are correctly positioned and the molding is mounted in position.

SUMMARY OF THE INVENTION

To accomplish the objects described above according to the present invention, there is provided a molding clip assemblage which comprises a base plate adapted to be fastened to the peripheral edge such as of a window frame and intended for the protection of said peripheral edge and clips adapted to be attached at proper intervals to the frontal surface of said base plate and intended to hold tightly in position a molding inserted therein, whereby the required mounting of the molding is accomplished by inserting the edge portion of the molding between the upper side of the base plate and the clips.

The molding clip assembly of the present invention has absolutely no possibility of inflicting any damage to the peripheral edge because the molding is forced in between the base plate and the clips and finally mounted in position without making any direct contact with the peripheral edge of the window frame. Nor has it any possibility of impairing the imperviousness of the molding to rainwater and dust from the ambience because the base plate is tightly attached in position without permitting any gap to occur between itself and the peripheral edge. Further since the base plate can easily be fastened to the peripheral edge of the window frame through the medium of a double-faced adhesive tape, the molding clip assembly enjoys outstanding workability and can be advantageously used for the attachment of a glass plate to a window frame, for example.

The other objects and characteristic features of the present invention will become apparent from the detailed description to be given herein below with reference to the attached drawing.

DETAILED DESCRIPTION OF THE INVENTION

Figure 1:
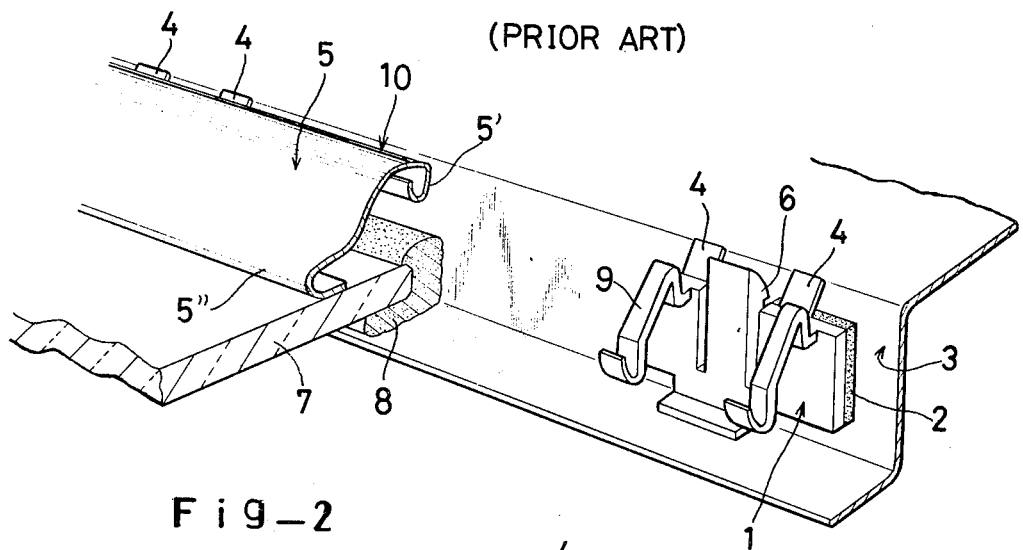
FIGS. 1 and 2 are an explanatory diagram and a longitudinally sectioned side view of a conventional molding clip held in a mounted state.
Figure 2:
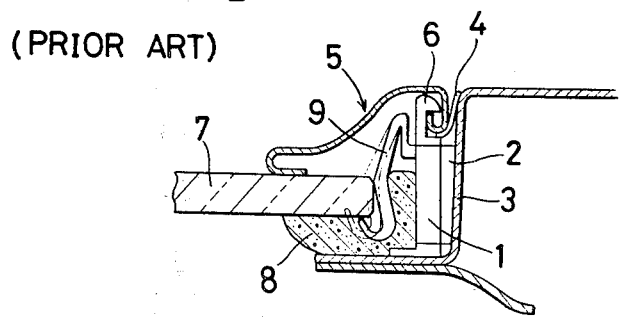

With reference to the accompanying drawing, the molding clip assemblage illustrated in FIGS. 1 and 2 represents one already disclosed in their former U.S. Patent Application mentioned above. The device disclosed therein accomplishes required attachment of a molding by attaching a plurality of clips formed of a plastic material to the peripheral edge of a window frame by the medium of a double-faced adhesive tape and then bringing the molding into hooked engagement with said clips. FIGS. 1 and 2 illustrate the mounting of a molding by use of a typical example of the previously disclosed clip. Clips 1 of this structure are fastened at proper intervals to the peripheral edge 3 of a window frame through the medium of double-faced adhesive tape 2. Basically, each clip 1 possesses protective tongue pieces 4 adapted to abut on the peripheral edge 3 of a window frame and a molding catch 6 adapted to catch firm unbreakable hold of the edge 5' of the molding 5 slid over said protective tongue pieces 4, so that required mounting of the molding is accomplished by inserting a glass plate 7 and causing the leading edge of said glass plate to be fastened to the inner portion of the peripheral edge through the medium of an adhesive agent 8 and subsequently causing said edge 5' of the molding 5 to slide over the protective tongue pieces 4 and come into fast hooked engagement with the molding catch 6 without allowing said edge 5' to inflict scratches or other injuries on the coated surface of the peripheral edge of the window frame. When the molding is thus brought into its mounted state as described above, the remaining edge 5" of the molding 5 resiliently presses the periphery of the glass plate downwardly. When necessary, said clip 1 may be provided not only with the protective tongue pieces 4 and the molding catch 6 but also additionally with resilient holder pieces 9 for holding fast in position the edge of the inserted glass plate as illustrated.

This molding clip assemblage has solved various problems involved in the conventional methods of windshield attachment such as, for example, infliction of damage to the peripheral edge of window frame and inefficient operation of molding attachment. In the method involving the use of clips of the structure described above, a gap occurs between the edge 5' of the molding 5 and the peripheral edge of the window frame 3 through which rainwater and dust may be admitted from the ambience and eventually degrade the adhesive strength of the double-faced adhesive tape 2 even to a point where there may be caused unexpected trouble. Further, this degradation may possibly lead to impairment of the appearance of the molding.

Figure 3:
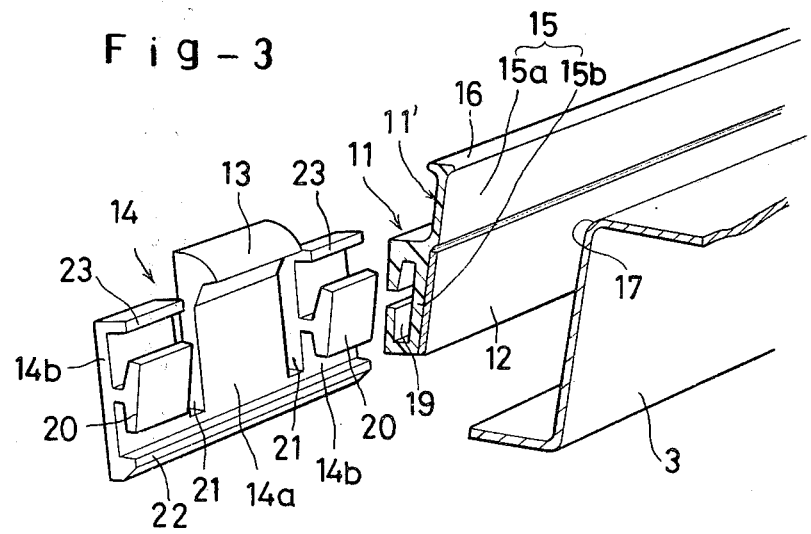
FIG. 3 is a perspective view illustrating one preferred embodiment of the molding clip assemblage of this invention, with the base plate and the clip opposed to each other.

With a view to overcoming the various problems described above, the present invention has brought about a novel molding clip assemblage. Illustrated in FIG. 3 is one embodiment of said assemblage, wherein a base plate 11 formed of a plastic material is fastened to the entire length of the peripheral edge 3 of the window frame through, for example, the medium of a double-faced adhesive tape 12 to have the upper edge of said peripheral edge covered throughout the entire length thereof with the top end 16 of said base plate 11 and a plurality of clips 14 each provided with a holder means 13 previously illustrated as a catch capable of taking firm, unbreakable hold of the edge of molding are disposed at proper intervals on the frontal surface of the base plate, so that required mounting of the molding is accomplished by inserting the glass plate to such an extent that the edge thereof is fastened to the inner side of the peripheral edge and thereafter causing the edge of the molding to slide in between the upper portion of the base plate and the clips and come into fast engagement with said holder means 13 of the clips. In this case, the clips 14 can be fastened to the frontal surface of the base plate 11 after said base plate has been fastened to the peripheral edge of window frame or they can be fastened in advance to the frontal surface of the base plate before the base plate is fastened by its rear surface to the peripheral edge.

The rear surface of the base plate 11 incorporates a longitudinal step so that when the upper part 15a above the step is brought into tight contact with the peripheral edge 3, the lower part 15b below the step falls short of coming into contact with the peripheral edge 3. A double-faced adhesive tape is placed in the space defined by the lower part 15b and the peripheral edge. The height of the step formed between the upper and lower parts is determined in accordance with the thickness of the double-faced adhesive tape 12, so that the tape 12 attached to the lower part serves the purpose of keeping the base plate and the peripheral edge toward each other across the tape and also keeping the upper part 15a of the rear surface in intimate contact with the peripheral edge.

Figure 4:
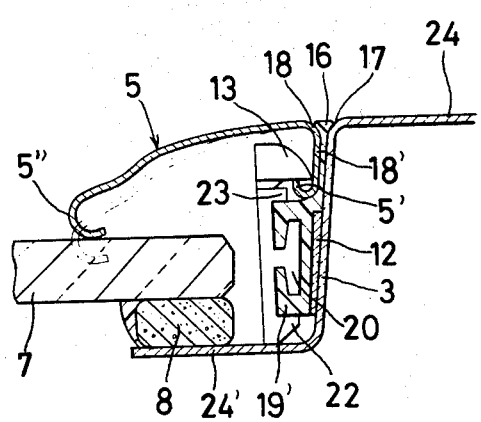
FIG. 4 is a longitudinally sectioned side view illustrating a glass plate mounted in position by means of the base plate and the clip of the assemblage of FIG. 3.

The top end 16 of the upper portion 11' of the base plate is desirably given the shape of a wedge as illustrated in FIG. 4. This is because in the peripheral edge 3 which is formed by inwardly bending a metal sheet constituting an automobile body, the upper ridge 17 of said bend of metal sheet is rounded to some extent and, in the molding in which the edge 5' terminates the leg portion 18' formed by perpendicularly bending a metal sheet, the ridge 18 of said perpendicular bend of metal sheet is similarly rounded to some extent. The wedge-shaped top end, therefore, proves to be highly advantageous because the diverging upper sides thereof come into intimate contact with said rounded ridges 17, 18 of the bends.

In the embodiment illustrated in FIGS. 3 and 4, the base plate 11 has an incised groove 19 of a T-shaped cross section formed longitudinally in the frontal side of the lower half portion of an increased wall thickness. This base plate 11 is extrusion molded of a plastic material in the direction of its length. The elongate stock thus obtained by extrusion molding may be cut to a length equalling that of the peripheral edge of the window frame. For adhesion of the base plate 11 to the peripheral edge, the double-faced adhesive tape 12 may be attached either continuously or intermittently at proper intervals to the lower part of the rear surface of the base plate throughout the entire length of said base plate.

The clips 14 are each provided on the rear surface thereof with a T-shaped fitting leg 20 adapted to make a free sliding contact with the incised groove 19 of the base plate 11. In the present embodiment, the clip 14 comprises a central piece 14a possessing a claw 13 and two lateral pieces 14b separated from said central piece 14a by vertically incised cuts 21 and possessing said fitting legs 20 one each on the rear surface thereof. It is fabricated integrally by one-shot injection molding of a plastic material.

Because of the construction described above, desired mounting of a molding can be accomplished by causing the fitting legs 20 of a required number of clips 14 to be brought into sliding contact with the incised groove 19 of the base plate 11 either after or before the base plate 11 is fastened to the peripheral edge 3 through the medium of an adhesive tape 12, subsequently moving the clips 14 to properly spaced positions on the base plate setting a glass plate in position and fastening the edge thereof to the peripheral edge and thereafter sliding the edge 5' of the molding 5 over the upper side of the base plate 11 until the edge 5' is brought into fast engagement with the claw 13. Consequently, the substantially upper portion 11' of the base plate 11 is tightly pinched between the leg 18' of the molding and the peripheral edge 3 and all the clips 14 are completely concealed behind the molding. If the top end 16 is in the shape of a wedge as described above, then the diverging upper sides thereof come into tight contact with the ridges 17, 18 of the bends in the leg 18' and the peripheral edge 3. The other edge 5" of the molding resiliently presses the edge of the glass downwardly.

During the insertion of the edge 5' of the molding, the claw 13 is temporarily pushed back to permit the passage of the edge 5' and, after the passage of the edge 5' is completed, is permitted to retain its former state and get firm hold of the edge 5'. In this case, since the central piece 14a possessing said claw 13 is separated from the lateral pieces by the vertical cuts 21, the central piece 14a alone is in most cases pushed back in conjunction with the claw 13. The fitting legs on the lateral pieces cannot slip out of the incised groove 19 even under abnormal conditions. However, if, after the molding has been mounted in position, a force powerful enough to make the central piece curve backward to a great degree is applied via the molding to the central piece 14a, the force is transmitted to the lateral pieces because they are connected at their bases to the central piece 14a. If the force is very powerful, therefore, there is a fair possibility that the fitting legs 20 will push open and slip out of the incised groove 19.

This possibility can be greatly reduced by providing the clip along the lower edge thereof with a backwardly protruding ridge 22 and also providing each of the lateral pieces 14b along the upper edge thereof with a backwardly protruding ridge 23, so that when the clip is attached to the base plate 11 by insertion of its fitting legs 20 into the incised groove 19, said protruding ridges 22, 23 come into sliding contact with the opposite ends of the L-shaped legs 19' of the base plate opposed to each other to enclose therein the incised groove 19. In this manner, the incised groove 19 is prevented from being pushed open enough to permit slippage of the fitting legs 20.

Generally, the peripheral edge 3 is inclined relative to the outer wall surface 24 or the inner wall surface 24' on which the glass plate rests (the wall surfaces 24, 24' being substantially parallel to each other). It is, therefore, desirable to have the fitting legs 20 disposed aslant relative to the rear surface of the clip 14 so that when the base plate is attached to the peripheral edge 3 and the clip is attached to the base plate, the frontal surface of the clip 14 falls substantially perpendicularly to said wall surfaces 24, 24'. The same result may otherwise be obtained by fabricating the base plate in a wedge-shaped cross section so that when the base plate is attached to the peripheral edge 3, the frontal surface of the base plate falls substantially perpendicularly to the wall surfaces 24, 24'.

Figure 5:
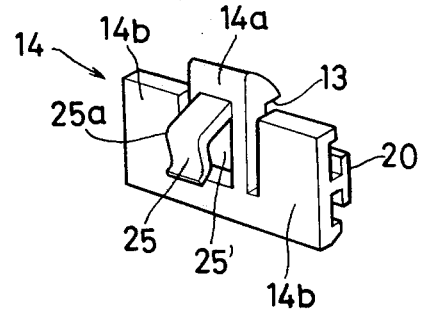
FIG. 5 is a perspective view illustrating another preferred embodiment of the clip in the molding clip assemblage of the present invention.
Figure 6:
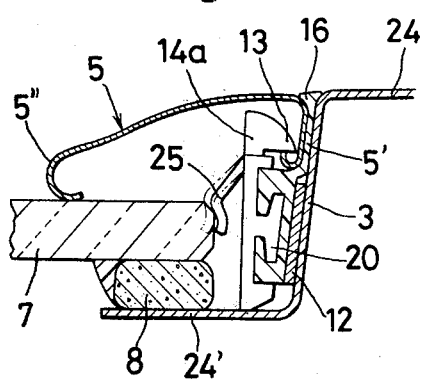
FIG. 6 is a longitudinally sectioned side view illustrating a glass plate held in position by use of the clip of FIG. 5.

The clip illustrated in FIGS. 5 and 6, though substantially similar to the clip of FIGS. 3 and 4, is different in respect that the central piece 14a thereof is provided with a tongue piece 25 having a cross section in a slightly diverged form of the letter L and serving to hold the edge of a glass plate.

The tongue piece 25 is connected to and hangs down from the upper edge of an opening 25' in the central piece 14a and thrusts outwardly from the frontal surface of the central piece. This clip is fastened to the base plate 11 secured to the peripheral edge 3 through insertion of the legs 20 in the same manner as the clip of FIGS. 3 and 4. This attachment of the clip is followed by insertion and attachment of the glass plate. While the glass plate is in the process of being attached, the end of the glass plate comes into contact with the bent portion 25a of the tongue piece 25, pushes back the tongue piece 25 and passes under the bent portion 25a to be finally held in position. After the edge of the glass plate completes its passage under the bent portion 25a, the tongue pieces which has so far been held back tends, by virtue of its resilience, to regain its former state, with the result that the lower half part of the bent portion presses the edge of the glass plate downwardly. Then, when the molding 5 is mounted in position, the glass plate will be held fast in position by the tongue piece 25 of the clip and the free end 5″ of the molding. The tongue piece 25 provided on this clip fulfils the same function as the resilient holder means 9 provided on the clip of prior art illustrated in FIGS. 1 and 2. When necessary, this tongue piece may be provided on each of the lateral pieces 14b instead of on the central piece 14a.

Figure 7:
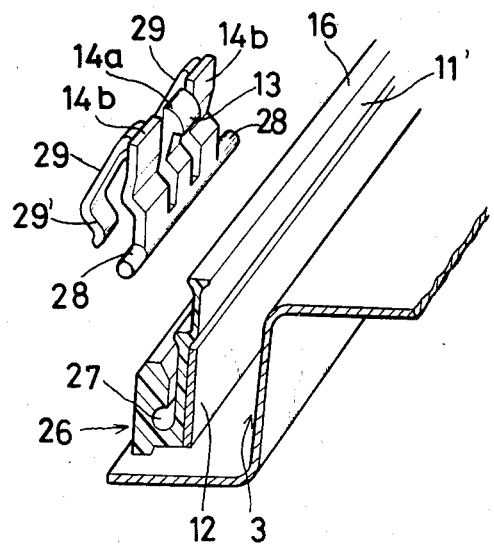
FIG. 7 is a perspective view illustrating still another preferred embodiment of the molding clip assemblage of the present invention.
Figure 8:
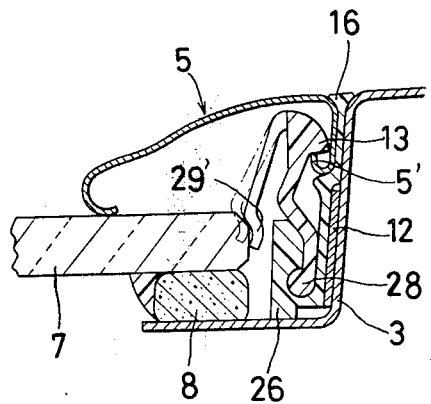
FIG. 8 is a longitudinally sectioned side view illustrating a glass plate mounted in position by use of the molding clip assemblage of FIG. 7.

The base plate illustrated in FIGS. 7 and 8 possesses an upper part 11′ similarly to that of the base plate so far described. It is, however, slightly different in the cross section of the lower half part 26 which has a greater wall thickness than the upper part. Said lower part 26 embraces an incised groove 27 of a cross section of the inverted letter P which opens upwardly, either flush with or slightly forward from the frontal surface of said upper part 11′. This base plate is similarly produced by one-shot extrusion molding of a plastic material. The rear surface of this base plate is similarly stepped.

By vertically inserted cuts, the clip is divided into a central piece 14a and lateral pieces 14b except in the lower end in which said pieces are mutually connected. This clip is similar to that of FIGS. 2 through 6 in the respect that it is provided at the upper end of the rear surface with a claw 13. The lower part of the common base of these divided pieces, namely the lower part of this clip, is so fabricated as to form a fitting leg 25 of the shape of an inverted letter P which can be inserted freely slidably in the aforementioned incised groove 27 of the shape of inverted letter P.

In the present embodiment, therefore, a required number of clips 14 can be set in position on the base plate by fastening a double-faced adhesive tape 12 to the lower part of the rear surface of the base plate for thereby attaching the base plate to the peripheral edge 3 and allowing the upper portion 11′ thereof to cover the upper side of the peripheral edge and thereafter inserting the fitting legs of the clips laterally into the incised groove 27 of the base plate. Then the glass plate is set in position and fastened to the peripheral edge and one edge 5′ of the molding is slid down over the frontal surface of the upper part of the clips until it is brought into fast engagement with the claw.

Similarly to the resilient holder means 9 shown in FIGS. 1 and 2, the present clip is provided with tongue pieces 29 each having a cross section in a slightly diverged form of the letter L. These tongue pieces 29 hang down slightly forwardly from the upper ends of the lateral pieces 14b, so that when the glass plate is inserted in position prior to the mounting of the molding, the lower half part 29′ of the bent portion presses down the glass plate similarly to the tongue piece 25 of the clip of FIGS. 5 and 6. Of course, one such tongue piece 29 may be provided on the central piece 14a similarly to that of FIGS. 5 and 6.

Figure 9A:
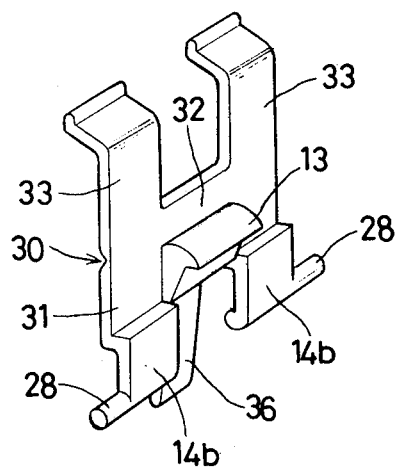
FIG. 9(A) is a perspective view illustrating in a developed form yet another preferred embodiment of the clip in the molding clip assemblage of the present invention.

FIGS. 9(A) and (B) illustrate still another embodiment of the clip usable for the purpose of this invention. FIG. 9(A) shows the clip obtained by injection molding of a synthetic resin in its unaltered form and FIG. 9(B) shows the same clip bent along the thin-walled hinge portion 30 illustrated in FIG. 9(A) so as to be ready for use.

Figure 9B:
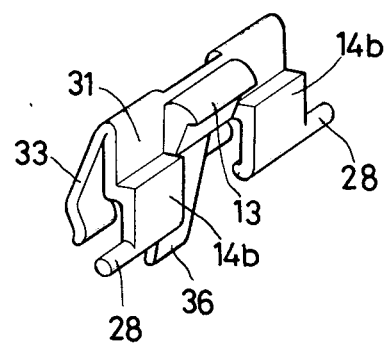
FIG. 9(B) is a perspective view illustrating the clip of FIG. 9(A) held in its working state.

As is clear from FIG. 9, of the upper and lower pieces which are bent along the hinge portion 30 toward each other in the shape of a peak, the lower piece 31 is extended downwardly into two opposed lateral pieces 14b each possessing a fitting leg 28 and has a claw 13 raised from the surface thereof between the aforementioned opposed lateral pieces. The upper piece 32, on the other hand, is extended into two opposed tongue pieces 33 which, when the upper piece is bent along the hinge portion 30, each assume a cross section in a slightly diverged form of the letter L and serve as resilient holder means capable of pressing the edge of the glass plate downwardly at a level corresponding to that of said lateral piece 14b. In other words, when the clip produced in the form illustrated in FIG. 9(A) is folded as shown in FIG. 9(B), it can be attached to the base plate of FIGS. 7 and 8 through insertion into the incised groove 27.

If in place of the fitting legs 28 of this clip, the fitting legs of the shape of the inverted letter T as illustrated in FIGS. 3, 4, 5 and 6 are provided on the opposed lateral pieces, then the clip can be used on the base plate having an incised groove of the shape of the letter T.

Figure 10:
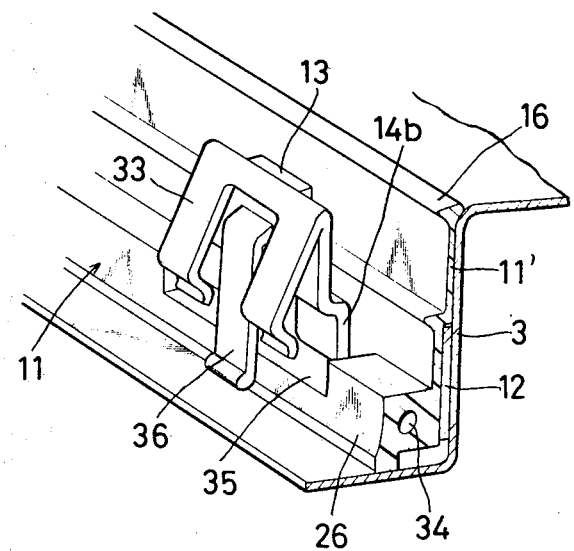
FIG. 10 is a perspective view illustrating a molding held in a mounted state by use of the clip of FIG. 9(B).

The clip illustrated in FIG. 9 is destitute of a central piece 14a and the lateral pieces 14b are separated from each other by an ample space. Thus, the two lateral pieces can be pushed and bent toward each other, with the intervening space decreased consequently. The advantage taken of the resilience of the clip that permits convergence of the opposed lateral pieces leads to yet another embodiment of the molding clip assemblage of this invention: The lateral pieces 14b are provided on their opposite sides, one each, with outwardly protruding fitting legs 28. At the same time, as illustrated in FIG. 10, the base plate 11 which has its upper part 11′ extending throughout the entire length of the peripheral edge is provided in its lower half part 26 of an increased wall thickness with a hole 34 disposed longitudinally in place of the aforementioned incised groove. Further, indentations of a length slightly greater than the length of the clip are formed at proper intervals in the lower half part 26 of the base plate. Then, the clips are attached one each to the indentations by bending the lateral pieces toward each other for thereby allowing the clip to slide into the indentation 35 and thereafter loosening the force keeping the lateral pieces in said contracted state for thereby allowing the outwardly extending fitting legs 28 of the lateral pieces to pass into the hole 34 opening at the opposite ends of the indentation 35. Consequently, the lower half part of the tongue piece 33 presses the edge of the inserted glass plate downwardly and, at the same time, the claw 13 catches firm hold of the edge 5′ of the molding.

Where the mounting is effected by use of indentations 35, a desire to keep the clip standing stably by itself until completion of the insertion of the glass plate is satisfied by providing the clip with a leg piece 36 extending downwardly through the space intervening between the tongue pieces 33 from the rear surface of the piece 31 at a level corresponding to that of the claw 13, allowing the leading end of said leg piece 36 to come into resilient contact with the frontal surface of the lower half part 26 of the base plate falling below the indentation 35 and, at the same time, causing the opposed lateral pieces to be pressed against the vertical surface of the indentation 35 or the frontal surface of the upper part of the base plate.

The base plate incorporating indentations 35 at prescribed intervals in the lower half portion 26 thereof may be produced by first extrusion molding a plastic material in a shape containing a through hole 34 but lacking indentations and thereafter removing portions so as to give rise to desired indentations. Otherwise, where the length of the base plate is already fixed, it can be injection molded, instead of extrusion molding, in a shape containing both said hole 36 and indentations 35 from the beginning. This means that the base plate can be manufactured without necessarily resorting to the technique of extrusion molding.

This invention has been described with reference to a few preferred embodiments. In short, the present invention aims to effect required mounting of a molding by attaching to the peripheral edge of a window frame a base plate provided with a portion serving to cover the entire length of the peripheral edge, attaching a plurality of clips at proper intervals to the base plate and inserting one edge of the molding between the clips and the portion of the base plate covering the peripheral edge. By use of the molding clip assemblage of this invention, it is now made possible to have the molding mounted in position more aesthetically and more conveniently than by the conventional art comprising the steps of attaching clips to the peripheral edge and inserting the molding into the engaging catches of the clips. The molding thus mounted in position by the present invention is perfectly impervious to rainwater and dust from the ambience. The present invention, therefore, is not limited to the illustrated embodiments herein contained but can be widely varied within the purview of the technical idea set forth in the claim hereinafter.

What is claimed is:

1. A molding clip assemblage which comprises a base plate provided in the frontal surface thereof with an incised groove and adapted to be fastened to the peripheral edge of a window frame for enclosing a glass plate such as a windshield and a plurality of clips intended to be attached at proper intervals to said base plate, said clips each being provided with holder means for catching firm hold of one edge of the molding and fitting legs adapted to be brought into engaging contact with said incised groove of the base plate, said base plate including a continuous upper portion adapted to be positioned between the peripheral edge of the window frame and the ridge of the molding in mounted position, the top edge of said upper portion of said base plate is fabricated in the shape of a wedge so that the diverging upper sides of said top edge will fill up a gap occurring between the radius of the upper ridge of the peripheral edge and the curved ridge of the molding mounted in position.

2. The molding clip assemblage according to claim 1, wherein a double-faced adhesive tape is used as means for fastening the base plate to the peripheral edge of the window frame.

3. The molding clip assemblage according to claim 1, wherein the clips are provided with resilient holder means adapted to get resilient hold of the edge of glass plate being inserted onto the peripheral edge of window frame.

4. A molding clip assemblage according to claim 1 wherein said base plate on the surface opposite to said frontal surface is provided with an upper portion and a lower portion, said lower portion being offset vertically from said upper portion to provide a longitudinally extending recess for acceptance of said tape.

5. A molding clip assemblage according to claim 1 wherein said incised groove and said fitting legs have a complementary T-shaped cross-sectional configuration.

6. A molding clip assemblage according to claim 5 wherein said clips each include a pair of rearwardly extending flange means for embracing said lower portion to prevent inadvertent opening of said incised groove.

7. A molding clip assemblage according to claim 6 wherein said holder means includes a centrally disposed resilient arm having a shoulder surface facing away from said frontal surface.

8. A molding clip assemblage according to claim 7 wherein said resilient arm includes a centrally disposed resilient holder means extending outwardly away from the frontal surface of the base plate for engagement with the edge of the glass plate being inserted into the window frame.

9. A molding clip assemblage according to claim 1 wherein said incised groove and said fitting legs are substantially P-shaped in cross section.

10. A molding clip assemblage according to claim 3 wherein said holder means for catching one edge of the molding is independently flexible of the resilient holder means adapted to hold the edge of the glass plate and are spaced laterally of each other.

* * * * *